Feb. 23, 1926.

J. H. O'BRIEN 1,574,501

REMOVABLE BODY FOR HAND TRUCKS

Filed August 26, 1925　　2 Sheets-Sheet 1

J. H. O'Brien
Inventor

Feb. 23, 1926.

J. H. O'BRIEN

REMOVABLE BODY FOR HAND TRUCKS

Filed August 26, 1925   2 Sheets-Sheet 2

1,574,501

J. H. O'Brien
Inventor

By C. A. Snow & Co.
Attorneys

Patented Feb. 23, 1926.

1,574,501

UNITED STATES PATENT OFFICE.

JOHN H. O'BRIEN, OF WATERTOWN, NEW YORK, ASSIGNOR TO ADAMS EQUIPMENT COMPANY, INC., OF WATERTOWN, NEW YORK.

REMOVABLE BODY FOR HAND TRUCKS.

Application filed August 26, 1925. Serial No. 52,678.

*To all whom it may concern:*

Be it known that I, JOHN H. O'BRIEN, a citizen of the United States, residing at Watertown, in the county of Jefferson and State of New York, have invented new and useful Removable Bodies for Hand Trucks, of which the following is a specification.

This invention relates to removable bodies for hand trucks and is designed more particularly as an improvement on the body disclosed in my U. S. Patent No. 1,548,094, issued to me on August 4, 1925.

It is an object of the present invention to provide a removable truck body the base portion and the upstanding portion of which can be disposed at right angles to each other but the parts so mounted that when a load is placed upon the body it can be tilted readily to position upon a hand truck properly placed relative thereto.

A further object is to provide a truck body which is free of projecting portions at the angle thereof.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
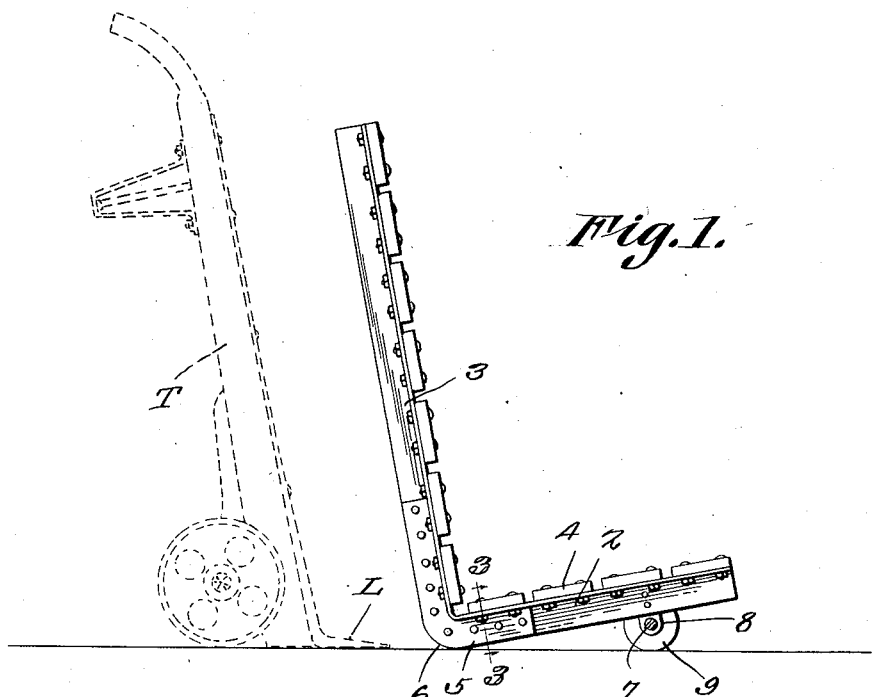
Figure 1 is a side elevation showing the truck body in load receiving position and also showing a hand truck positioned to pick up the body, said truck being shown by broken lines.

Referring to the figures by characters of reference 1 designates angle strips or other suitable forms of strips or bars each of which may be bent to form a right angle so that each strip includes a base portion 2 and an upstanding portion 3 at right angles to each other. Each angle strip has a flange extending laterally to which are secured cross slats 4 or the like, some of which form the base of the truck body while the remainder form the back or normally upstanding portion. The other flange of each angle strip is extended at right angles to these slats and where each angle strip is bent it is reinforced by a plate 5 attached to the outstanding flange and having a rounded outer corner as shown at 6.

Figure 2:
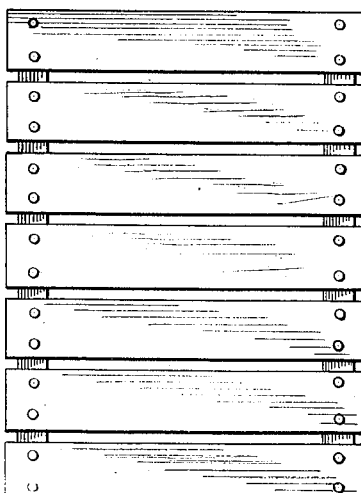
Figure 2 is a front elevation of the truck body.
Figure 3:
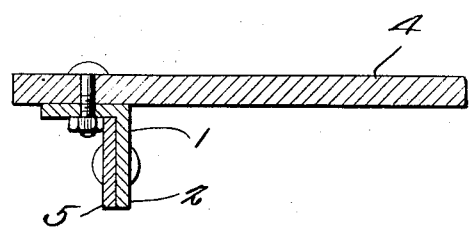
Figure 3 is an enlarged section on line 3—3 Figure 1.
Figure 4:
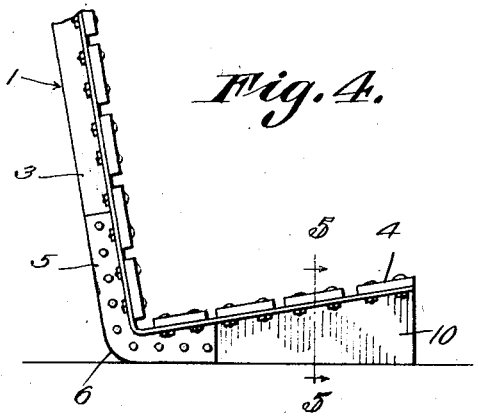
Figure 4 is a side elevation showing a slightly modified form of body.

With the truck body constructed as described it will be seen that when an ordinary hand truck such as indicated at T in Figure 1 is brought to position back of the body the lip or projecting plate L of the truck can be inserted readily between the angle strips and under the body. As the upstanding portion is at right angles to the base portion of the body, however, it would be quite difficult to overbalance or tilt this body if loaded with merchandise or the like so as to bring the upstanding portion against the bottom of the truck. To facilitate the tilting of the loaded body it is essential that the center of gravity of the load be brought close to that end of the base of the body from which the upstanding portion extends. In the structure disclosed in my patent hereinbefore referred to this object was obtained by extending the upstanding portion at an obtuse angle to the base portion of the body and providing fulcrum projections at the angle of the body. For certain reasons which have developed through use it has been found that such a construction is not always desirable and the present invention has been devised for the purpose of overcoming the objections. Therefore, instead of forming the body to produce an obtuse angle, the right angle body has been supported at the free end of its base by various means one of which has been illustrated in Figures 1 and 2. This means includes an axle 7 mounted in bearings 8 depending from the angle strips 2, there being small wheels 9 supporting the ends of the axle. With this arrangement of wheels the body is supported in a tilted position as shown in Figure 1 so that when a load is placed thereon the center of gravity will be slightly to the right of the angle of the body shown in Figure 1. Consequently when the truck T is brought to body receiving position, the body can be easily overbalanced onto the truck so that the upstanding portion will rest thereon.

Figure 5:
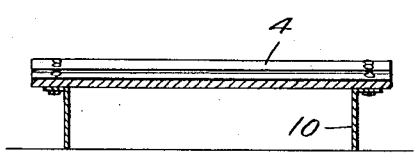
Figure 5 is a section on line 5—5 Figure 4.
Figure 6:
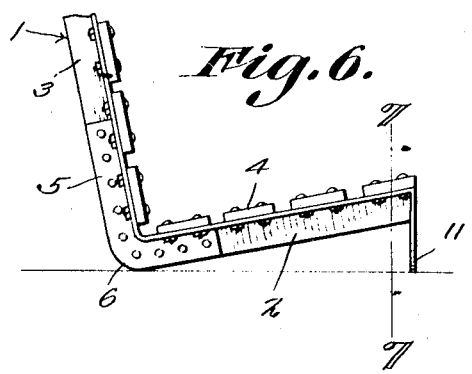
Figure 6 is a side elevation of another modified form of body.
Figure 7:
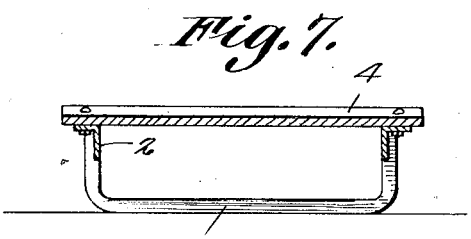
Figure 7 is a section on line 7—7 Figure 6.
Figure 8:
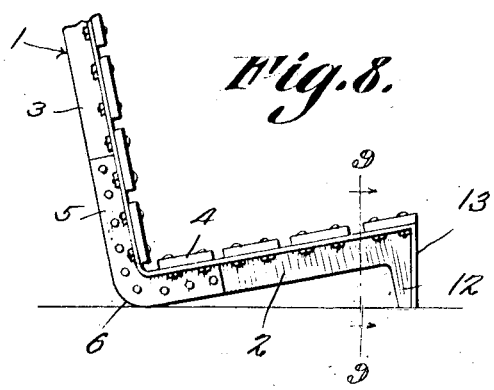
Figure 8 is a side elevation of another modified form of body.
Figure 9:
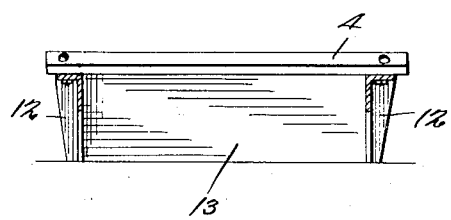
Figure 9 is a section on line 9—9 Figure 8.

Other means than the wheels may be employed for holding the body in an inclined position. For example, and as shown in Figure 5, the flanges of the base portions of the angle strips can be made substantially wedge shape as indicated at 10, or, if preferred, a depending rigid bail 11 can be connected to the free ends of the base portions of the angle strips and extended transversely under the free ends of the base of the truck body. A modification of this arrangement has been illustrated in Figures 8 and 9 wherein the side flanges of the angle strips are provided with downturned extensions 12 connected by a transverse flange or lip 13 integral therewith.

In ony one of these described structures the truck body is supported with the upstanding portion at such an angle that when a load is placed on the body the center of gravity will be close to but to the right of the angle of the body in Figure 1 so that the said body will not tilt when standing on a platform. However, whenever a truck is brought to position against the upstanding portion of the body said body can be swung past the dead center with little exertion on the part of the operator with the result that it will be brought to position on the trunk.

What is claimed is:

1. A removable body for hand trucks including strips, connections therebetween, said strips providing a bottom portion and an upstanding portion at an angle to each other, reinforcing means attached to the strips adjacent the angle of the body, and means depending from the body adjacent the free end of the bottom of the body for supporting said body in an inclined position with the center of gravity passing through the bottom of the body close to but without intersecting the upstanding portion of the body.

2. A removable body for hand trucks including angle strips, connections therebetween, said strips being bent to provide a bottom portion and an upstanding portion at right angles to each other, reinforcing means attached to the flanges of the angle strips at the angle of the body, and means depending from the angle strips adjacent the free end of the bottom of the body for supporting said body in an inclined position with the center of gravity passing through the bottom of the body close to but without intersecting the upstanding portion of the body.

In testimony that I claim the foregoing as my own, I have hereto affixed by signature.

JOHN H. O'BRIEN.